United States Patent
Kojima et al.

(10) Patent No.: US 7,392,870 B2
(45) Date of Patent: Jul. 1, 2008

(54) POWER MODULE DRIVING CONTROL APPARATUS AND HYBRID VEHICLE

(75) Inventors: Hiroyuki Kojima, Saitama (JP); Takashi Ozeki, Saitama (JP); Yoshiaki Tsukada, Saitama (JP); Hiroaki Uchisasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 520 days.

(21) Appl. No.: 11/189,763

(22) Filed: Jul. 27, 2005

(65) Prior Publication Data

US 2006/0032689 A1   Feb. 16, 2006

(30) Foreign Application Priority Data

Aug. 10, 2004 (JP) ............................. 2004-233156

(51) Int. Cl.
*B62K 11/00* (2006.01)
(52) U.S. Cl. ........................... 180/65.2; 180/220
(58) Field of Classification Search ............... 180/65.1, 180/65.2, 65.3, 65.4, 220
See application file for complete search history.

(56) References Cited

U.S. PATENT DOCUMENTS

| | | | |
|---|---|---|---|
| 5,406,154 A * | 4/1995 | Kawaguchi et al. | 310/67 R |
| 6,048,289 A * | 4/2000 | Hattori et al. | 477/15 |
| 6,218,804 B1 * | 4/2001 | Toriyama et al. | 320/104 |
| 6,276,481 B1 * | 8/2001 | Matsuto et al. | 180/220 |
| 6,344,008 B1 * | 2/2002 | Nagano et al. | 475/1 |

FOREIGN PATENT DOCUMENTS

JP   2000-350310 A   12/2000

* cited by examiner

*Primary Examiner*—Christopher Ellis
*Assistant Examiner*—Brian Swenson
(74) *Attorney, Agent, or Firm*—Birch, Stewart, Kolasch & Birch, LLP

(57) ABSTRACT

To provide a power module driving control apparatus and a hybrid vehicle capable of obtaining sufficient accelerator response despite adoption of a speed sensing type clutch for connection and disconnection of a power drive between an engine side and a driving wheel side. When a rotational speed on an input side of a centrifugal clutch falls short of a set value, at which the clutch can be connected, and an acceleration request is made by a rider, a control unit controls a motor generator so as to bring the rotational speed on the input side of the clutch near to the set value. When the motor generator is made to function as a motor, rotation on the input side of the clutch is assisted. When the motor generator functions as a generator, an amount of electricity generated is decreased.

20 Claims, 6 Drawing Sheets

POWER MODULE DRIVING CONTROL APPARATUS AND HYBRID VEHICLE

CROSS-REFERENCE TO RELATED APPLICATIONS

The present non-provisional application claims priority under 35 USC 119 to Japanese Patent Application No. 2004-233156 filed on Aug. 10, 2004 the entire contents thereof is hereby incorporated by reference.

BACKGROUND OF THE INVENTION

1. Field of the Invention

The present invention relates to a driving control apparatus, in which a motor generator connected to a crankshaft of an engine is controllable. A power module is provided for transmitting an engine power drive to the side of a driving wheel through a clutch. A hybrid vehicle is provided with the driving control apparatus.

2. Description of Background Art

A hybrid vehicle mounted with an engine and an electric motor as a vehicle power drive sources is known. See, for example, Japanese Patent Laid-open No. 2000-350310.

In the hybrid vehicle disclosed in Japanese Patent Laid-open No. 2000-350310, the electric motor is operated with a torque value greater than that for starting the engine when a operating mode is changed from a motor operating mode to an engine operating mode. This is done to prevent an engine starting lag.

In a power unit of a hybrid vehicle, the connection and disconnection of the power drive from an engine side can be accurately controlled by means of an electromagnetic clutch, a hydraulic clutch, or the like. With a scooter type compact motorcycle or the like, it has been lately studied to adopt a speed sensing type clutch, such as a centrifugal clutch or the like that connects or disconnects the power drive according to a rotational speed on the side of a crankshaft (an input side).

In a hybrid vehicle using the speed sensing type clutch for connecting and disconnecting the power drive between the engine side and the driving wheel side, an attempt may be made to open an accelerator again for acceleration after the accelerator has temporarily been returned during operation. In such instances, it can at times take some time for the rotational speed on the crankshaft side (input side) to return to a level, at which the clutch can be connected.

With this hybrid vehicle, it takes time for the rotational speed on the crankshaft side (input side) to return to the level, at which the clutch can be connected, even by attempting to open the accelerator widely for sudden starting or other needs. It can therefore happen that it takes time to switch from a motor drive to an engine drive and thus only insufficient starting acceleration performance can be derived.

SUMMARY AND OBJECTS OF THE INVENTION

It is therefore an object of the present invention to provide a power module driving control apparatus and a hybrid vehicle capable of obtaining sufficient accelerator response despite adoption of a speed sensing type clutch for connection and disconnection of a power drive between an engine side and a driving wheel side.

To achieve the foregoing object, a first aspect of the present invention provides a driving control apparatus for a power module including an engine 20 serving as a power drive source and a motor generator connected to a crankshaft of the engine, for functioning as a motor and a generator 21a. A speed sensing type clutch, for example, a centrifugal clutch 40, is provided wherein an input side is connected to the crankshaft and an output side is connected to a driving wheel side, for connecting the input side and the output side when a rotational speed on the input side becomes equal to, or more than, a set value. Control means, for example, a control unit 7, is provided for controlling the motor generator. In this driving control apparatus, the following arrangement is made. More specifically, when an acceleration request is made under a condition, in which the rotational speed on the input side of the clutch falls short of the set value, the control means controls the motor generator so as to bring the rotational speed on the input side of the clutch near to the set value.

According to the first embodiment of the present invention, if an acceleration request is made through an accelerator operation performed by a rider when the rotational speed on the input side of the clutch falls short of the set value, the control means sends a control signal to the motor generator so that the rotational speed on the input side of the clutch becomes close to the set value. This increases the speed of the crankshaft on the input side of the clutch so that the clutch may be quickly connected and the power drive of the engine may be transmitted to the driving wheel side.

According to a second embodiment of the present invention, the control means makes the motor generator function as a motor and rotation of the crankshaft is assisted with a power drive thus derived for a stepped-up speed. In this case, the power drive of the motor generator serves as an assist force for the crankshaft. As a result, the connection of the clutch is expedited.

According to a third embodiment of the present invention, the control means makes the motor generator function as a generator and an amount of electricity generated by the motor generator is decreased so as to lessen an engine load. In this case, the engine load is decreased for the decreased amount of electricity generated by the motor generator. As a result, the connection of the clutch is expedited.

According to a fourth embodiment of the present invention, the control means includes a clutch state determination portion 96 for determining a connected state or a disconnected state of the clutch and an acceleration request determination portion 97 for determining whether or not there is an acceleration request made by a rider. In this driving control apparatus, the following arrangement is made. More specifically, when these determination portions determine that the clutch is disconnected and there is an acceleration request, the motor generator is controlled such that the rotational speed on the input side of the clutch is brought near to the set value. In this case, the motor generator is controlled only in a condition, in which it is absolutely necessary to increase the speed on the input side of the clutch among different needs of starting and reacceleration.

According to a fifth embodiment of the present invention, the present invention provides a hybrid vehicle including an engine serving as a first power drive source and a motor generator connected to a crankshaft of the engine, for functioning as a motor and a generator. A speed sensing type clutch, an input side of which is connected to the crankshaft and an output side of which is connected to a driving wheel side, is provided for connecting the input side and the output side when a rotational speed on the input side becomes equal to, or more than, a set value. Control means are provided for controlling the motor generator. An electric motor 21b is disposed between the output side of the clutch and the driving wheel, for functioning as a second power drive source, the clutch being connected when drive by the electric motor is changed to drive by the engine. In this hybrid vehicle, the following arrangement is made. More specifically, when an acceleration request is made under a condition, in which the rotational speed on the input side of the clutch falls short of the set value, the control means controls the motor generator so as to bring the rotational speed on the input side of the clutch near to the set value.

According to the fifth embodiment of the present invention, if the accelerator is operated in a wide open direction during sudden starting or the like, the control means sends a control signal to the motor generator so that the rotational speed on the input side of the clutch becomes close to the set value. This increases the speed of the crankshaft on the input side of the clutch so that the clutch may be quickly connected and the drive by the electric motor is switched to the drive by the engine.

According to the first embodiment of the present invention, if an acceleration request is made when the rotational speed on the input side of the clutch falls short of the set value, the motor generator is controlled such that the rotational speed on the input side of the clutch reaches a level that allows the clutch to be connected. Accordingly, despite the adoption of the speed sensing type clutch, connection of the clutch is expedited and sufficient accelerator response can be achieved at all times.

According to the second embodiment of the present invention, since the power drive of the motor generator acts on the crankshaft as an assist force, the rotational speed of the crankshaft can be actively increased to enhance greater acceleration response.

According to the third embodiment of the present invention, the engine load is reduced by decreasing the amount of electricity generated by the motor generator. Acceleration response can thereby be enhanced.

According to the fourth embodiment of the present invention, control of the motor generator is performed only in the condition, in which it is absolutely necessary to increase the speed on the input side of the clutch among different needs of starting and reacceleration. Thus, unnecessary consumption of electricity or an unstable charged state of the battery can be eliminated.

According to the fifth embodiment of the present invention, a sufficient acceleration response can be achieved at all times despite adoption of the speed sensing type clutch. It is also possible to quickly switch from the drive by the electric motor to the drive by the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be described with reference to the accompanying drawings.

In the description that follows hereunder, "front side" refers to a forward direction of a vehicle. "Right-hand side" and "left-hand side" refer to the right-hand side and the left-hand side of the vehicle, looking the vehicle in the forward direction.

Figure 1:
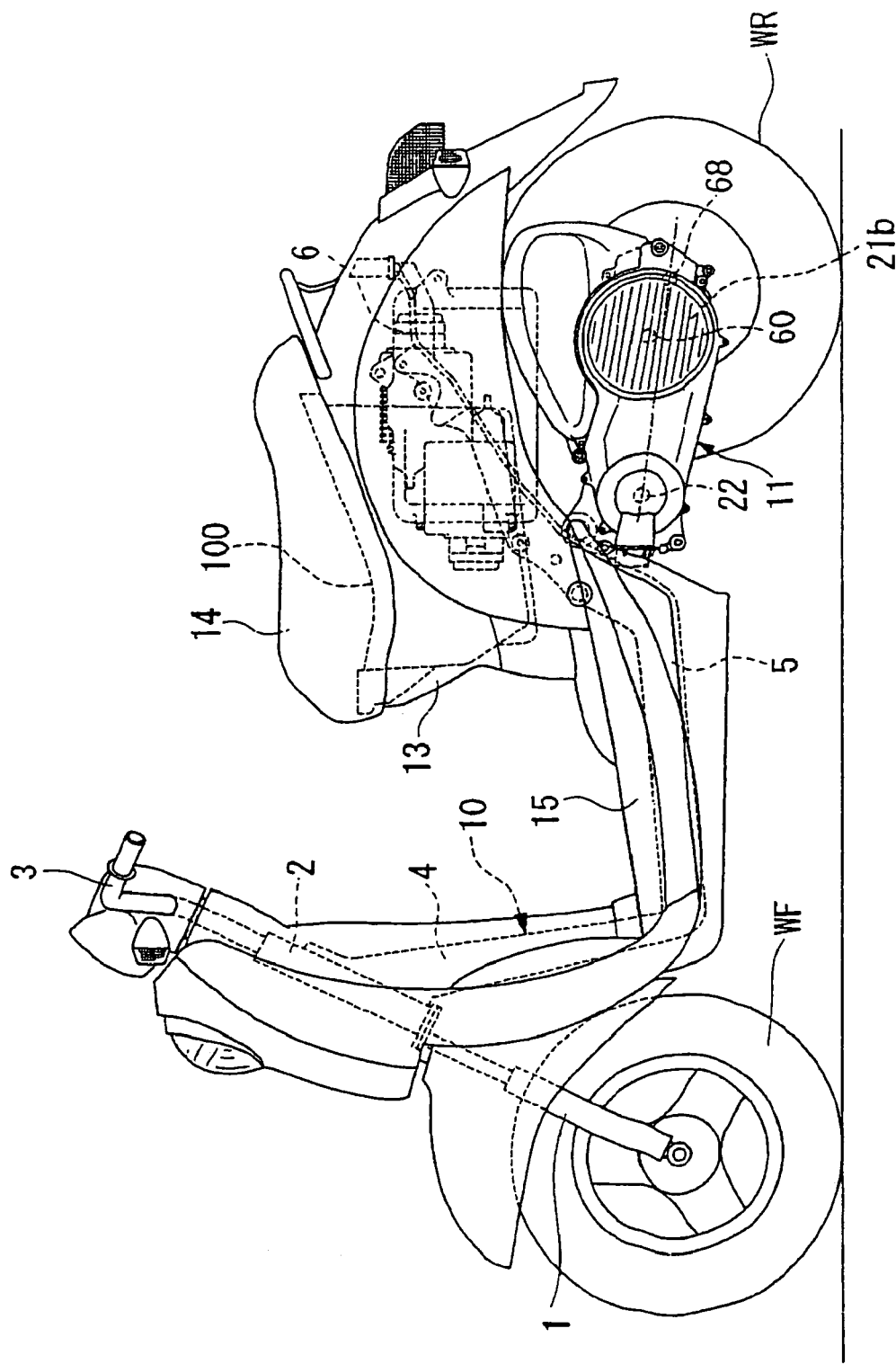
FIG. 1 is a side elevational view showing a vehicle according to a preferred embodiment of the present invention.

The vehicle according to the preferred embodiment of the present invention is a scooter type hybrid vehicle. Referring to FIG. 1, the vehicle includes a power unit 11 including an electric motor 21b. The power unit 11 is swingably supported as a unit swing type on a vehicle body frame 10 together with a rear wheel WR.

A front fork 1 for journaling a front wheel WF is disposed forward of the vehicle. The front fork 1 is rotatably supported on a head pipe 2 that forms part of the vehicle body frame 10. An upper end portion of the front fork 1 is connected to a handlebar 3. The vehicle can be steered by operating the handlebar 3. A down pipe 4 extending downwardly from a rear portion of the head pipe 2 is attached to the head pipe 2. An intermediate frame 5 is disposed on a lower end of the down pipe 4 so as to extend substantially horizontally. A rear portion frame 6 extending upwardly and rearwardly is disposed at a rear end portion of the intermediate frame 5. The vehicle body frame 10 thus includes, as main elements thereof, the head pipe 2, the down pipe 4, the intermediate frame 5, and the rear portion frame 6.

A vehicle body cover 13 covers an outer periphery of the vehicle body frame 10. A seat 14, on which a rider sits, is secured to a portion bulging upwardly at substantially a center of the vehicle body cover 13. A step floor 15, on which the rider rests his or her feet, is formed one step down and forward of the seat 14. A storage box 100 is disposed downwardly of the seat 14. The storage box 100 functions as a utility space for storing a helmet, luggage, and the like.

Figure 2:
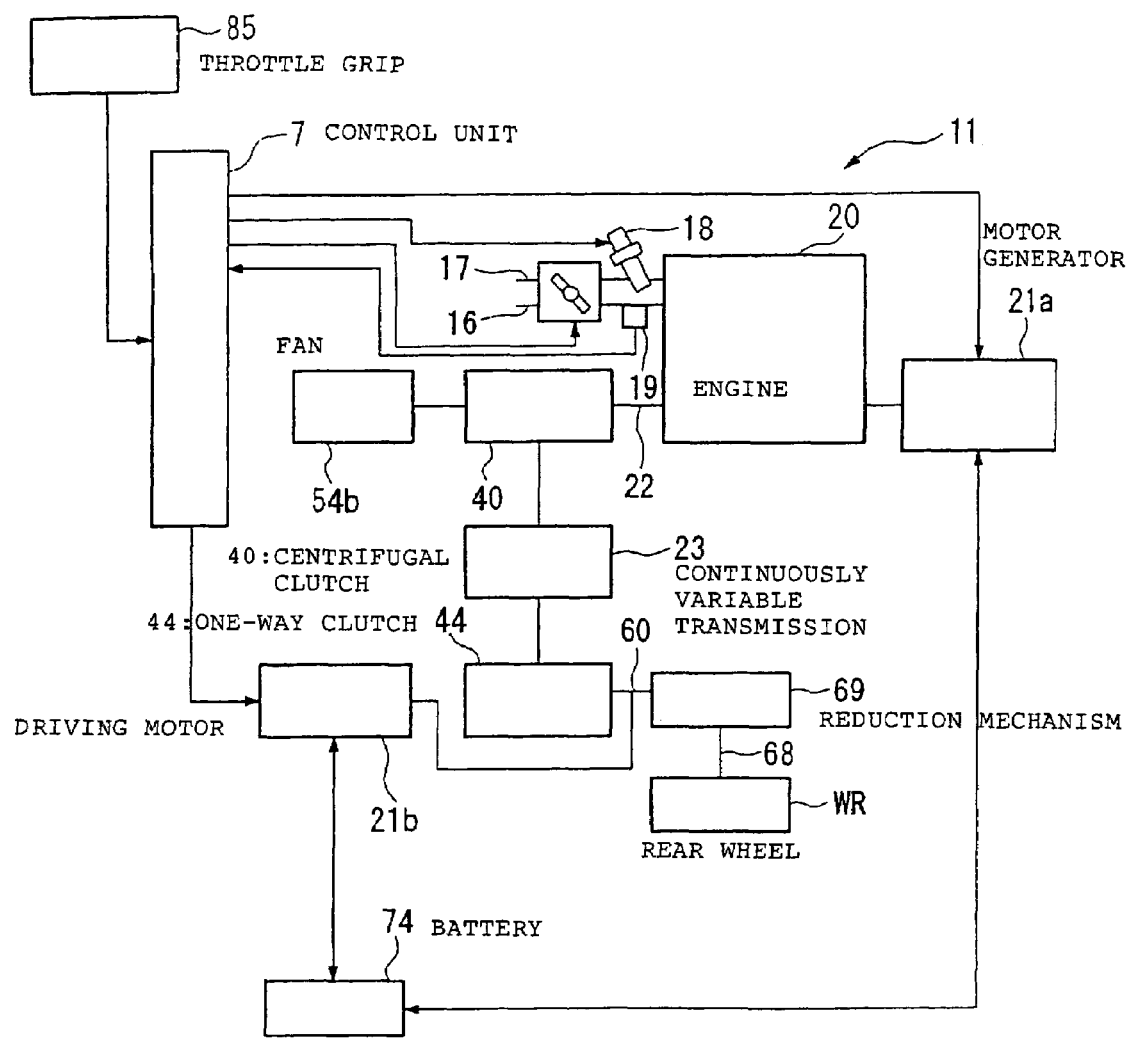
FIG. 2 is a functional block diagram showing schematically a system configuration of the vehicle shown in FIG. 1.

A schematic configuration of the power unit 11 will be described with reference to FIG. 2. The power unit 11 includes an engine 20, a motor generator 21a, a continuously variable transmission 23, a centrifugal clutch 40, a one-way clutch 44, a reduction mechanism 69, and the aforementioned electric motor 21b. The engine 20 serves as a first power drive source. The motor generator 21a functions as a generator as well as a starter for starting the engine 20. The continuously variable transmission 23 translates a power drive of the engine 20 to a gear ratio corresponding to an engine operating speed and transmits the power drive to the rear wheel WR as a driving wheel. The centrifugal clutch 40, as a speed sensing type clutch, is disposed midway between the engine 20 and the continuously variable transmission 23. The centrifugal clutch 40 connects or disconnects a power drive transmission. The one-way clutch 44 transmits a power drive from the continuously variable transmission 23 to the side of the rear wheel WR, but not the other way around. The reduction mechanism 69 is disposed between an output portion on the side of the rear wheel WR of the one-way clutch 44 (a driven shaft 60) and an axle 68 of the rear wheel WR. The reduction mechanism 69 reduces the speed of an output transmitted to the rear wheel WR. The electric motor 21b is connected to an input side of the reduction mechanism 69. The electric motor 21b functions as a generator as well as a motor serving as a second power drive source.

The power unit 11 basically has two drive systems. In one of the two drive systems, the power drive from the engine 20 is transmitted to the rear wheel WR through the centrifugal clutch 40, the continuously variable transmission 23, the one-way clutch 44, the driven shaft 60, and the reduction mechanism 69. In the other drive system, the power drive from the electric motor 21b is transmitted to the rear wheel WR through the driven shaft 60 and the reduction mechanism 69.

A battery 74 is connected to the motor generator 21a and the electric motor 21b. When functioning as a starter and a motor, the motor generator 21a and the electric motor 21b, respectively, receive a supply of electricity from the battery 74. When functioning as a generator, the motor generator 21a and the electric motor 21b, respectively, charge the battery 74 with a regenerative power. In the vehicle according to the preferred embodiment of the present invention, the electric motor 21b is driven during starting or the like mainly by electricity generated by the motor generator 21a.

A control unit 7 controls the engine 20, the motor generator 21a, the electric motor 21b, and the like.

The engine 20 is arranged to draw in an air-fuel mixture through an intake pipe 16 and burn the mixture. A throttle valve 17 for controlling an amount of air is rotatably disposed in the intake pipe 16. The throttle valve 17 is rotated according to an amount of operation of a throttle grip operated by the rider. In FIG. 2, a throttle opening sensor 85 is provided for the throttle grip. An injector 18 and a vacuum sensor 19 are disposed between the throttle valve 17 and the engine 20. The injector 18 injects fuel. The vacuum sensor 19 detects a negative pressure in the intake pipe.

Figure 3:
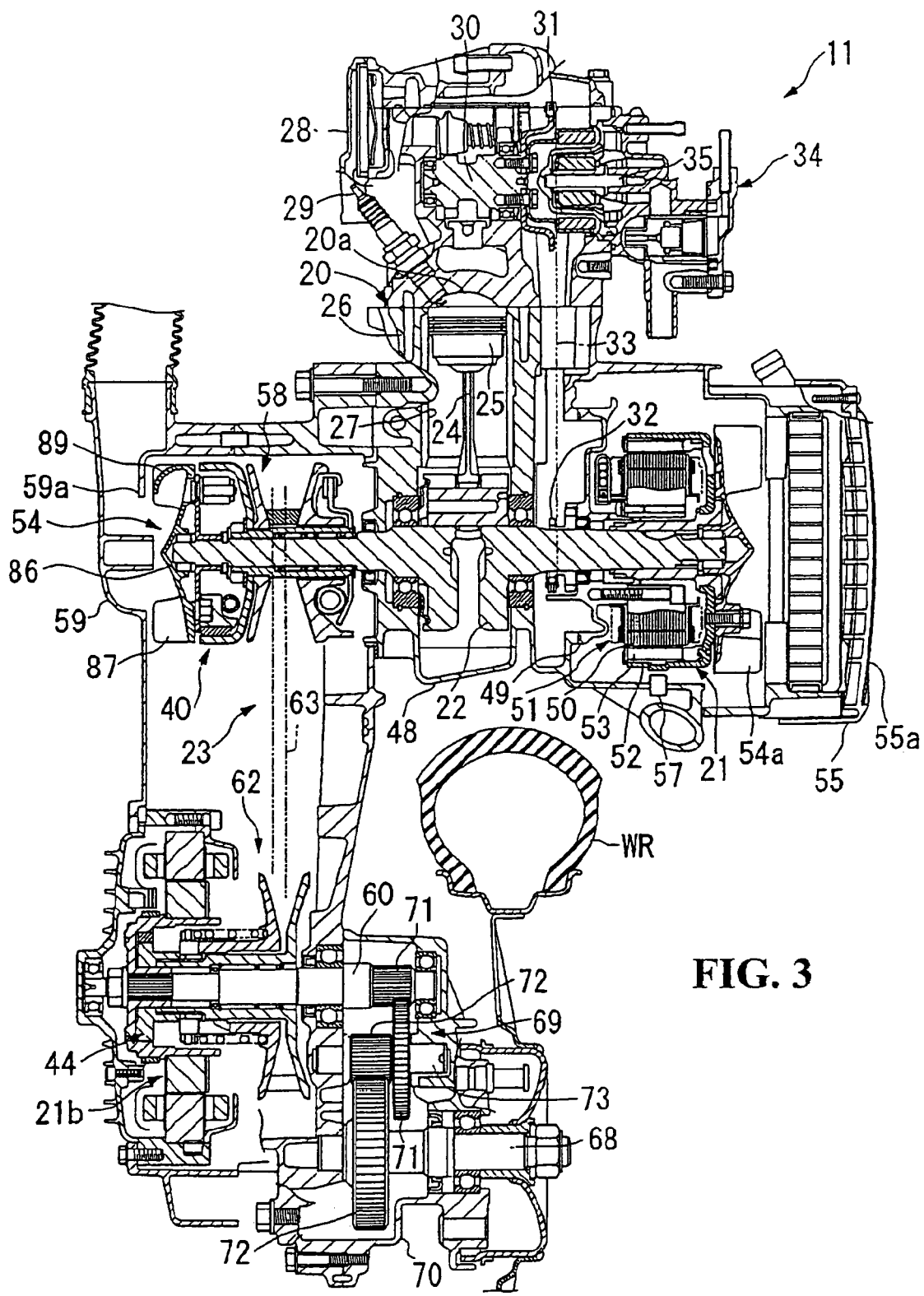
FIG. 3 is a cross-sectional view showing a power unit of the vehicle shown in FIG. 1.

Referring to FIG. 3, the structure of the power unit 11 will be described in detail.

The engine 20 is constructed as follows. More specifically, a piston 25 is slidably accommodated in a cylinder 27 of a cylinder block 26. A crankshaft 22 is connected via a connecting rod 24 to the piston 25. The cylinder block 26 is disposed such that an axis of the cylinder 27 runs substantially horizontally. A cylinder head 28 is secured to a head portion of the cylinder block 26 so as to close one end of the cylinder 27. A combustion chamber 20a for burning the air-fuel mixture is formed between the cylinder head 28 and the piston 25.

The cylinder head 28 includes a valve (not shown) for controlling intake or exhaust of the air-fuel mixture to or from the combustion chamber 20a, and an ignition plug 29. Opening or closing of the valve is controlled through rotation of a camshaft 30 journaled on the cylinder head 28. A driven sprocket 31 is mounted on one end of the camshaft 30. An endless cam chain 33 is wound around the driven sprocket 31 and a drive sprocket 32 disposed on one end of the crankshaft 22. The camshaft 30 is operatively connected with the rotation of the crankshaft 22 through the cam chain 33. A water pump 34 for cooling the engine 20 is mounted on the one end of the camshaft 30.

The water pump 34 is mounted such that a rotational axis 35 thereof rotates integrally with the camshaft 30. Accordingly, rotating the camshaft 30 operates the water pump 34.

A stator case 49 is connected on the right-hand side in a vehicle width direction of a crankcase 48 that journals the crankshaft 22. The motor generator 21a is housed in the stator case 49. The motor generator 21a is what is called an outer rotor type. A stator of the motor generator 21a includes a coil 51 which is a conductive wire wound around teeth 50 secured to the stator case 49. An outer rotor 52 is, on the other hand, secured to the crankshaft 22. The outer rotor 52 is of a substantially cylindrical shape covering an outer periphery of the stator. A magnet 53 is disposed on an inner peripheral surface of the outer rotor 52.

The outer rotor 52 includes a centrifugal fan 54a for cooling the motor generator 21a. When the centrifugal fan 54a rotates in synchronism with the crankshaft 22, outside air is drawn in through a cooling air intake port formed in a side surface 55a of a cover 55 of the stator case 49.

A driving side transmission pulley 58 of the continuously variable transmission 23 is mounted via the centrifugal clutch 40 at a left end portion of the crankshaft 22 projecting in the vehicle width direction from the crankcase 48.

The continuously variable transmission 23 includes this driving side transmission pulley 58 journaled on the crankshaft 22, a driven side transmission pulley 62, and an endless V-belt 63. The driven side transmission pulley 62 is mounted via the one-way clutch 44 on the driven shaft 60 disposed to have an axis operation parallel with the crankshaft 22. The endless V-belt 63 transmits a rotational power drive from the driving side transmission pulley 58 to the driven side transmission pulley 62.

Figure 4:
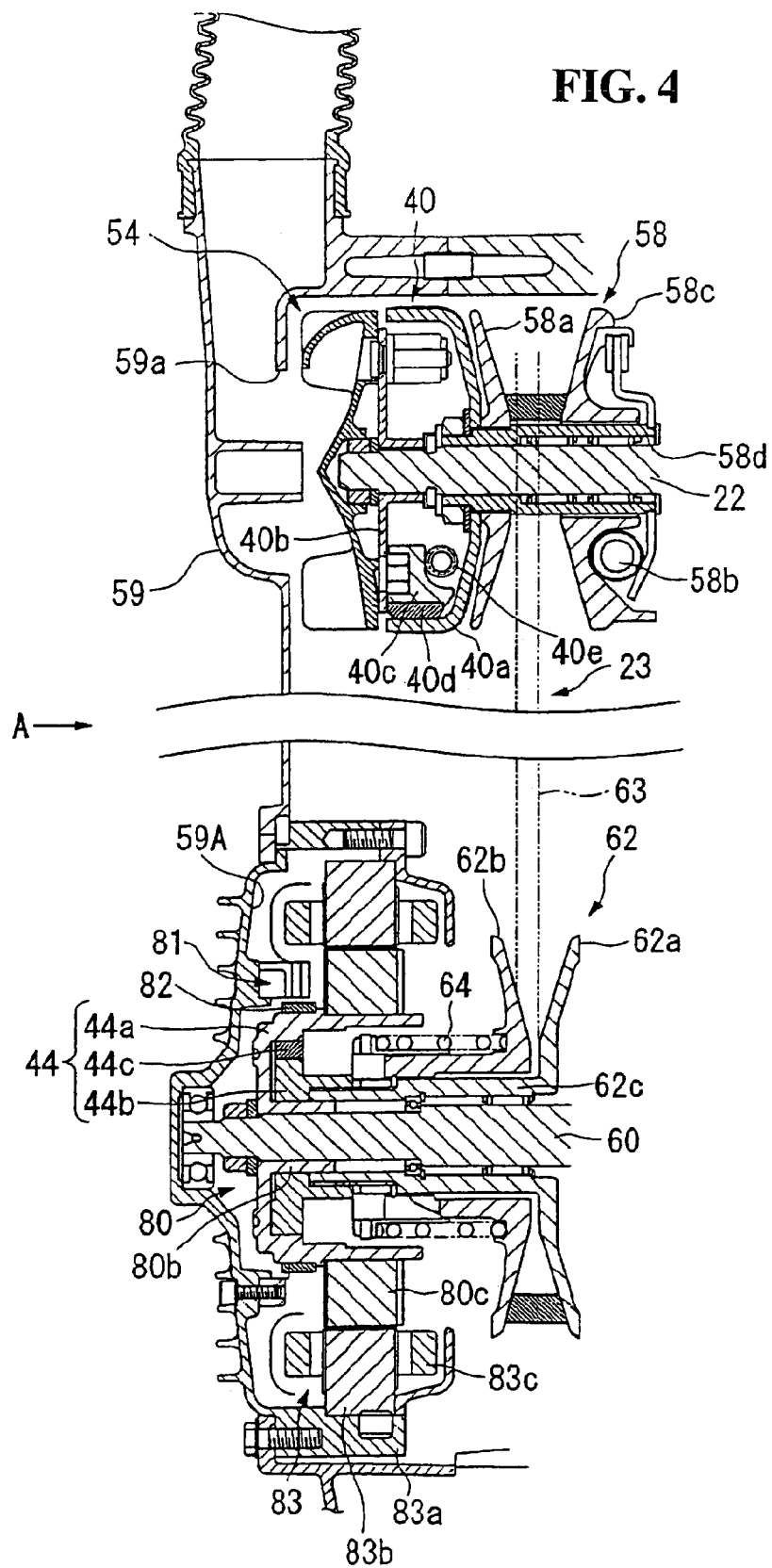
FIG. 4 is a partly enlarged view of FIG. 3.
Figure 5:
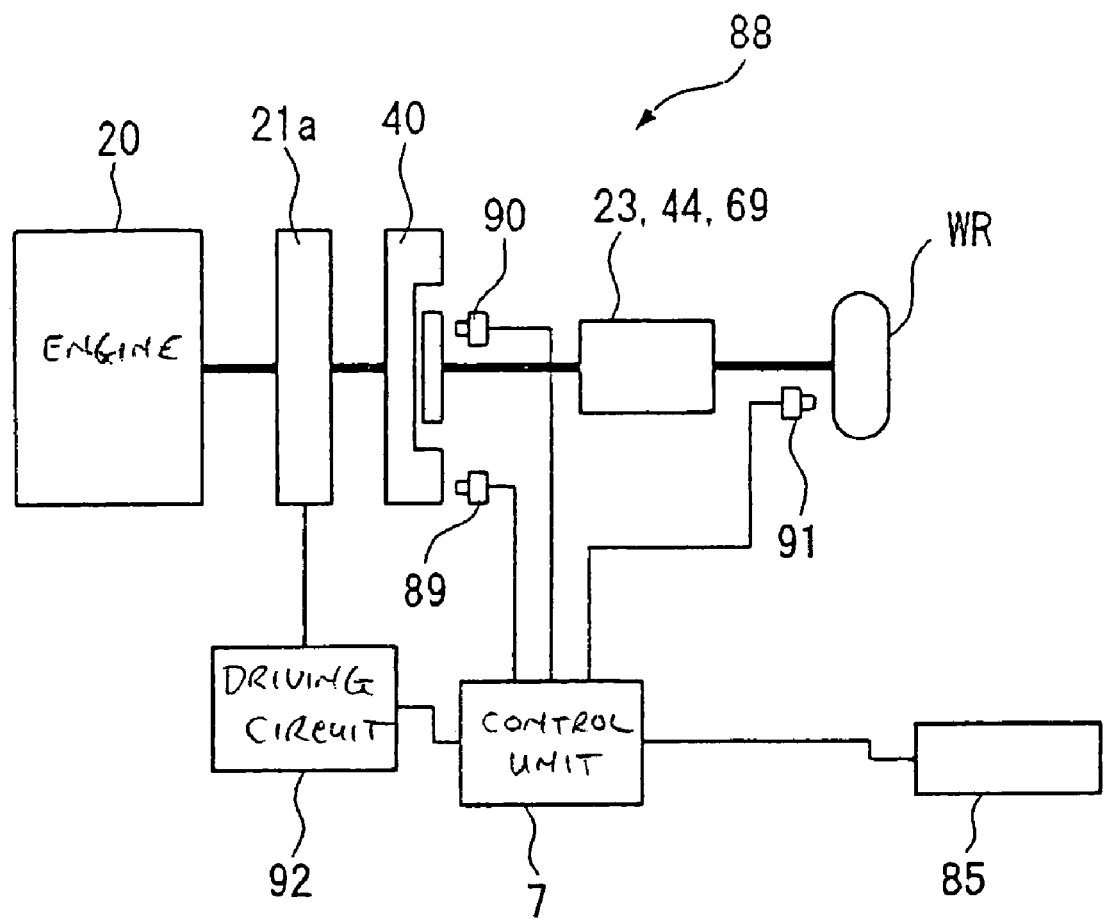
FIG. 5 is a schematic diagram showing a driving system formed around a clutch of the vehicle shown in FIG. 1.

Referring to an enlarged view shown in FIG. 4, the driving side transmission pulley 58 is rotatably mounted on the crankshaft 22 via a sleeve 58d. The driving side transmission pulley 58 includes a driving side fixed pulley half 58a and a driving side movable pulley half 58c. The driving side fixed pulley half 58a is fixed to the sleeve 58d. The driving side movable pulley half 58c is mounted on the sleeve 58d such that the pulley half 58c is axially slidable, but unable to make a circumferential rotation relative to the sleeve 58d. A weight roller 58b is mounted to the driving side movable pulley half 58c. The weight roller 58b displaces the driving side movable pulley half 58c in a direction of the driving side fixed pulley half 58a according to a centrifugal force.

The driven side transmission pulley 62, on the other hand, includes a driven side fixed pulley half 62a and a driven side movable pulley half 62b. The driven side fixed pulley half 62a is circumferentially rotatably mounted on the driven shaft 60, while being restricted in its axial sliding motion relative to the driven shaft 60. The driven side movable pulley half 62b is axially slidably mounted on a boss portion 62c of the driven side fixed pulley half 62a. A spring 64 is disposed on the backside (on the left-hand side in the vehicle width direction) of the driven side movable pulley half 62b. The spring 64 urges the driven side movable pulley half 62b toward the driven side fixed pulley half 62a at all times.

The V-belt 63 is wound around each of belt grooves having substantially a V-shaped cross section formed between the driving side fixed pulley half 58a and the driving side movable pulley half 58c, and between the driven side fixed pulley half 62a and the driven side movable pulley half 62b.

In this continuously variable transmission 23, when the speed of the crankshaft 22 increases, a centrifugal force acts on the weight roller 58b in the driving side transmission pulley 58 so that the driving side movable pulley half 58c slides toward the side of the driving side fixed pulley half 58a. At this time, the driving side movable pulley half 58c comes closer to the driving side fixed pulley half 58a by the amount of this sliding motion. This decreases a groove width of the driving side transmission pulley 58. A position of contact between the driving side transmission pulley 58 and the V-belt 63 is then deviated radially outwardly of the driving side transmission pulley 58, causing a winding diameter of the V-belt 63 to increase. This results in the following occurring in the driven side transmission pulley 62. More specifically, a groove width formed by the driven side fixed pulley half 62a and the driven side movable pulley half 62b increases. That is, the winding diameter of the V-belt 63 (a transmission pitch diameter) continuously varies according to the speed of the crankshaft 22. This results in the gear ratio being automatically and steplessly varied.

The centrifugal clutch 40 is disposed on an end portion on the left-hand side of the vehicle. The location is part of the crankshaft 22, penetrating through the driving side fixed pulley half 58a of the continuously variable transmission 23. The centrifugal clutch 40 includes an outer case 40a, an inner plate 40b, a weight 40c, a shoe 40d, and a spring 40e. The outer case 40a of a cup shape is fixed to the sleeve 58d. The inner plate 40b is fixed on a left end portion of the crankshaft 22 that penetrates through the outer case 40a. The shoe 40d is mounted on a surface of the inner plate 40b facing an inside of the outer case 40a via the weight 40c so as to face radially outwardly. The spring 40e urges the shoe 40d radially inwardly. According to an embodiment of the present invention, the inner plate 40b, the weight 40c, and the shoe 40d constitute an inner rotating body of the centrifugal clutch 40. The outer case 40a constitutes an outer rotating body of the centrifugal clutch 40. A centrifugal fan 54 is mounted on an outer end face of the inner plate 40b of the centrifugal clutch 40. A blowing action of the centrifugal fan 54 allows outside air drawn in through an intake port 59a of a transmission case 59 to circulate through the transmission case 59.

The centrifugal fan 54 thus constructed accomplishes a connection and disconnection of the power drive through a balance between the centrifugal force of the weight 40c and a urging force of the spring 40e. When the rotational speed of the crankshaft 22 remains lower than a set value (for example, 3,000 rpm), power transmission is disconnected using the urging force of the spring 40e. When the rotational speed of the crankshaft 22 thereafter increases to exceed the set value, the centrifugal force of the weight 40c overcomes the urging force of the spring 40e. As a result, the weight 40e moves radially outwardly so that the shoe 40d is pressed against an inner peripheral surface of the outer case 40a. At this time, a friction sliding occurs between the shoe 40d and the outer case 40a. During this period, the power drive is gradually transmitted. Consequently, the rotation of the crankshaft 22 is transmitted to the sleeve 58d through the centrifugal clutch 40. This drives the driving side transmission pulley 58 secured to the sleeve 58d.

The one-way clutch 44 includes an outer clutch 44a, an inner clutch 44b, and a roller 44c. The outer clutch 44a is of a cup shape. The inner clutch 44b is internally inserted in the outer clutch 44a coaxially therewith. The roller 44c allows the power drive to be transmitted in one direction only from the inner clutch 44b to the outer clutch 44a. The outer clutch 44a serves also as an inner rotor main body for the electric motor 21b. The outer clutch 44a is formed of the same member as the inner rotor main body. An inner periphery of the inner clutch 44b is in splined engagement with a left end portion of the boss portion 62c in the driven side fixed pulley half 62a.

Accordingly, in this one-way clutch 44, the power drive of the engine 20 transmitted to the driven side transmission pulley 62 of the continuously variable transmission 23 is transmitted to the rear wheel WR by way of the driven shaft 60 and the reduction mechanism 69. The power drive inputted from the side of the rear wheel WR through the reduction mechanism 69 and the driven shaft 60 is not, on the other hand, transmitted to the side of the continuously variable transmission 23. Consequently, when the vehicle is pulled by walking or during a regenerative operation, the power drive on the side of the rear wheel WR turns the outer clutch 44a only idly relative to the inner clutch 44b. The power drive is not therefore transmitted to the continuously variable transmission 23 and the engine 20.

The reduction mechanism 69 includes an intermediate shaft 73 that is journaled in parallel with the driven shaft 60 and the axle 68 of the rear wheel WR. The reduction mechanism 69 further includes a pair of first reduction gears 71, 71 and a pair of second reduction gears 72, 72. The first reduction gears 71, 71 are formed on a right end portion of the driven shaft 60 and a central portion of the intermediate shaft 73, respectively. The second reduction gears 72, 72 are formed on the intermediate shaft 73 and a left end portion of the axle 68, respectively.

Through such an arrangement, the speed of rotation of the driven shaft 60 is reduced at a predetermined reduction ratio. Rotation of the driven shaft 60 is then transmitted to the axle 68 of the rear wheel WR that is journaled in parallel with the driven shaft 60.

The electric motor 21b is an inner rotor type motor having the driven shaft 60 as its output shaft. The aforementioned inner clutch 44b forms an inner rotor main body of an inner rotor 80. A stator 83 of the electric motor 21b is secured via a stator case 83a to an inner side of the transmission case 59 for covering a side portion of the centrifugal clutch 40 and the continuously variable transmission 23. The stator 83 includes teeth 83b, around which a coil 83c is wound.

The outer clutch 44a is formed into a cup shape. A boss portion 80b formed to jut out at a central portion of the outer clutch 44a is in splined engagement with the driven shaft 60. A magnet 80c is disposed on an outer peripheral surface on an open side of the outer clutch 44a so as to oppose the teeth 83b of the stator 83. A plurality of detected bodies 82 are mounted on an outer peripheral surface on the side of a bottom portion of the outer clutch 44a. A rotor sensor 81 mounted on an inner wall 59A of the transmission case 59 detects the plurality of detected bodies 82.

The electric motor 21b as arranged as described in the foregoing functions as a motor at starting or when assisting the output of the engine 20. In addition, the electric motor 21b converts rotation of the driven shaft 60 to a corresponding electric energy, thereby functioning as a generator for recharging the battery 74 shown in FIG. 2.

A driving control apparatus 88 for the power module 11 according to the preferred embodiment of the present invention includes the aforementioned engine 20, the starter generator 21a, the centrifugal clutch 40, and the control unit 7 as a control means. The aforementioned throttle opening sensor 85, an input speed sensor 89, an output speed sensor 90, and a vehicle speed sensor 91 are connected to the control unit 7. The input speed sensor 89 detects a rotational speed on an input side of the centrifugal clutch 40. The output speed sensor 90 detects a rotational speed on an output side of the centrifugal clutch 40. The vehicle speed sensor 91 detects a rotational speed of the rear wheel WR. The motor generator 21a is controlled by the control unit 7 through a driving circuit 92 including an inverter.

The motor generator 21a is used as appropriately selected to function as a motor or a generator by a control signal received from the control unit 7 according to an operating condition of the vehicle. If an acceleration request is received from the rider when the centrifugal clutch 40 is in the state of power drive disconnection, the motor generator 21a functions as the motor. The motor generator 21a thereby assists the crankshaft 22 in drive to expedite the connection of the centrifugal clutch 40. When functioning as the generator, the motor generator 21a decreases the amount of electricity generated, thereby expediting the connection of the centrifugal clutch 40.

Figure 6:
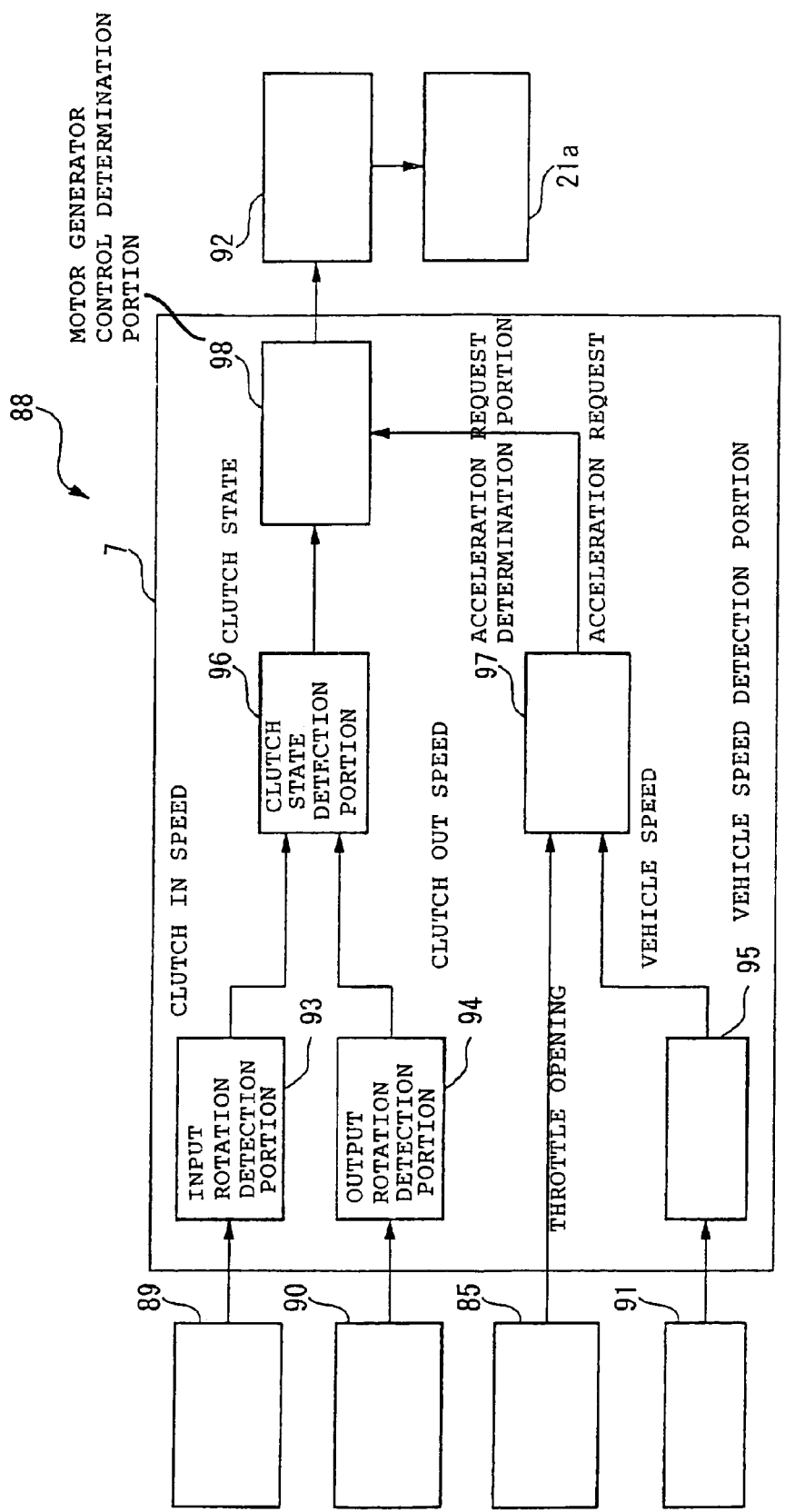
FIG. 6 is a functional block diagram showing a control unit and related components of the vehicle shown in FIG. 1.

The control unit 7 for controlling the motor generator 21a includes, as shown in FIG. 6, an input rotation detection portion 93, an output rotation detection portion 94, and a vehicle speed detection portion 95. The control unit 7 further includes a clutch state determination portion 96, an acceleration request determination portion 97, and a generator control determination portion 98. The input rotation detection portion 93 receives a signal from the input speed sensor 89. The output rotation detection portion 94 receives a signal from the output speed sensor 90. The vehicle speed detection portion 95 receives a signal from the vehicle speed sensor 91. The clutch state determination portion 96 determines the state of the centrifugal clutch 40, whether connected or disconnected, by comparing the signal from the input rotation detection portion 93 with the signal from the output rotation detection portion 94. The acceleration request determination portion 97 determines whether there is an acceleration request from the rider based on the outputs from the vehicle speed detection portion 95 and the throttle opening sensor 85. The generator control determination portion 98 determines whether to perform a control of the motor generator 21a for expediting a clutch connection based on the outputs from the clutch state determination portion 96 and the acceleration request determination portion 97.

The control unit 7 produces an output of a control signal to the driving circuit 92 of the starter generator 21a through the generator control determination portion 98 if the following conditions are met. More specifically, the control unit 7 produces the output if the clutch state determination portion 96 determines that the centrifugal clutch 40 is disconnected and the acceleration request determination portion 97 determines that there is an acceleration request from the rider.

The basic operations of the vehicle will now be described.

When the engine is to be started, the motor generator 21a on the crankshaft 22 is used to turn the crankshaft 22. At this time, the centrifugal clutch 40 is not connected and a power drive transmission from the crankshaft 22 to the continuously variable transmission 23 is shut off. The air-fuel mixture drawn into the cylinder 27 is burned with the ignition plug in synchronism with rotation of the crankshaft 22, thereby causing the piston 25 to make a reciprocating motion.

To start the vehicle in this condition, the electric motor 21b is operated using electricity generated by the motor generator 21a or electricity generated by the battery 74. A driving force of the electric motor 21b corresponding to the amount of the throttle opening operated by the rider is thereby transmitted to the rear wheel. During this time, the speed of the crankshaft 22 increases with the amount of throttle opening on the part of the engine 20. When the speed exceeds a set value (for example, 3,000 rpm), the rotational power drive of the crankshaft 22 is transmitted to the continuously variable transmission 23 through the centrifugal clutch 40. When the power drive of the engine 20 is transmitted to the reduction mechanism 69 through the continuously variable transmission 23 and the one-way clutch 44, the rear wheel WR receives the power drive to start rotating. The drive of the electric motor 21b is thereafter stopped and a operational mode driven by the engine 20 is selected.

During the starting of the vehicle, the rotational speed of the crankshaft 22 falls short of the set value in the beginnings of the operation of the throttle and the centrifugal clutch 40 is disconnected. Since the acceleration request is made by the rider in this condition, the control unit 7 produces an output of a control signal to the motor generator 21a for expediting the connection of the centrifugal clutch 40. More specifically, under a condition, in which the motor generator 21a can be used as a motor, the drive of the crankshaft 22 (clutch input side) is assisted by making the motor generator 21a function as the motor. Under a condition, in which the motor generator 21a is operated as the motor, an engine load is reduced by decreasing the amount of electricity generated by the motor generator 21a. Accordingly, in this vehicle, control of the motor generator 21a allows the connection of the centrifugal clutch 40 to be expedited during starting. The power drive of the engine 20 can therefore be quickly transmitted to the rear wheel WR, thus improving the starting performance (acceleration performance).

During an ordinary operational mode driven by the engine, when the throttle is temporarily returned to decrease the rotational speed on the input side of the centrifugal clutch 40 down to the set value and then the throttle is operated again toward an opening direction, the motor generator 21a is controlled in the same manner as that during the starting of the vehicle as described above. This results in an expediting of the reconnection of the centrifugal clutch 40. Accordingly, in this vehicle, this positively increases the acceleration response to throttle operation.

According to the preferred embodiment of the present invention, using the functions provided by the sensors 85, 89, 90, 91, the clutch state determination portion 96 and the acceleration request determination portion 97 of the control unit, the connection state of the centrifugal clutch 40 and whether or not there is an acceleration request are determined. Control is thereby provided to give an assist force by the motor generator 21a and decrease the amount of electricity generated only under conditions, in which it is absolutely necessary to expedite the connection of the centrifugal clutch 40. This eliminates unnecessary consumption of electricity, an unstable charged state of the battery due to a reduction in the amount of electricity generated, and the like.

The present invention is not limited to the aforementioned embodiment and can be implemented in various manners without departing from the spirit thereof. For instance, the following modifications are possible as well. More specifically, instead of using the centrifugal clutch used as the speed sensing type clutch for disconnecting the engine power drive according to the preferred embodiment of the present invention, a sensor may be used to detect the rotational speed on the input side. When the rotational speed detected by the sensor exceeds a preset value, transmission of the power drive may be accomplished by means of an electromagnetic force or a hydraulic pressure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving control apparatus for a power module, comprising:
   an engine serving as a power drive source;
   a motor generator connected to a crankshaft of the engine, for functioning as a motor and a generator;
   a speed sensing type clutch, an input side of which is connected to the crankshaft and an output side of which is connected to a driving wheel side, for connecting the input side and the output side when a rotational speed on the input side becomes equal to, or more than, a set value; and
   control means for controlling the motor generator;

wherein when an acceleration request is made under a condition, in which the rotational speed on the input side of the clutch falls short of the set value, the control means controls the motor generator so as to bring the rotational speed on the input side of the clutch near to the set value.

2. The power module driving control apparatus according to claim 1, wherein the control means makes the motor generator function as a motor and rotation of the crankshaft is assisted with a power drive thus derived for a stepped-up speed.

3. The power module driving control apparatus according to claim 2, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

4. The power module driving control apparatus according to claim 1, wherein the control means makes the motor generator function as a generator and an amount of electricity generated by the motor generator is decreased so as to lessen an engine load.

5. The power module driving control apparatus according to claim 4, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

6. The power module driving control apparatus according to claim 1, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

7. The power module driving control apparatus according to claim 1, wherein said speed sensing type clutch includes an inner plate, a weight and a shoe that form an inner rotating body and an outer rotating body that is operatively positioned relative to said inner rotating body for forming a centrifugal clutch.

8. The power module driving control apparatus according to claim 7, and further including a centrifugal fan mounted on an outer end face of the inner plate for drawing in air from an intake port and circulating air relative to the centrifugal clutch.

9. The power module driving control apparatus according to claim 7, and further including a spring operatively mounted relative to the weight wherein when the rotational speed of the crankshaft remains lower than the set value, power transmission is disconnected using a force of the spring and when the rotational speed of the crankshaft exceeds the set value, the centrifugal force of the weight overcomes the force of the spring for transmitting through the centrifugal clutch.

10. The power module driving control apparatus according to claim 9, wherein the set value of the rotational speed is 3,000 rpm.

11. A hybrid vehicle, comprising:
an engine serving as a first power drive source;
a motor generator connected to a crankshaft of the engine, for functioning as a motor and a generator;
a speed sensing type clutch, an input side of which is connected to the crankshaft and an output side of which is connected to a driving wheel side, for connecting the input side and the output side when a rotational speed on the input side becomes equal to, or more than, a set value;
control means for controlling the motor generator; and
an electric motor disposed between the output side of the clutch and the driving wheel, for functioning as a second power drive source, the clutch being connected when drive by the electric motor is changed to drive by the engine;
wherein, when an acceleration request is made under a condition, in which the rotational speed on the input side of the clutch falls short of the set value, the control means controls the motor generator so as to bring the rotational speed on the input side of the clutch near to the set value.

12. The hybrid vehicle according to claim 11, wherein the control means makes the motor generator function as a motor and rotation of the crankshaft is assisted with a power drive thus derived for a stepped-up speed.

13. The hybrid vehicle according to claim 12, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

14. The hybrid vehicle according to claim 11, wherein the control means makes the motor generator function as a generator and an amount of electricity generated by the motor generator is decreased so as to lessen an engine load.

15. The hybrid vehicle according to claim 14, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

16. The hybrid vehicle apparatus according to claim 11, wherein the control means includes a clutch state determination portion for determining a connected state or a disconnected state of the clutch and an acceleration request determination portion for determining whether or not there is an acceleration request made by an operator; and wherein when these determination portions determine that the clutch is disconnected and there is an acceleration request, the motor generator is controlled such that the rotational speed on the input side of the clutch is brought near to the set value.

17. The hybrid vehicle according to claim 11, wherein said speed sensing type clutch includes an inner plate, a weight and a shoe that form an inner rotating body and an outer rotating body that is operatively positioned relative to said inner rotating body for forming a centrifugal clutch.

18. The hybrid vehicle according to claim 17, and further including a centrifugal fan mounted on an outer end face of the inner plate for drawing in air from an intake port and circulating air relative to the centrifugal clutch.

19. The hybrid vehicle according to claim 17, and further including a spring operatively mounted relative to the weight wherein when the rotational speed of the crankshaft remains lower than the set value, power transmission is disconnected using a force of the spring and when the rotational speed of the crankshaft exceeds the set value, the centrifugal force of the weight overcomes the force of the spring for transmitting through the centrifugal clutch.

20. The hybrid vehicle according to claim 19, wherein the set value of the rotational speed is 3,000 rpm.

* * * * *